C. B. ROBERTSON.
TENT.
APPLICATION FILED JUNE 14, 1919.
1,363,437.
Patented Dec. 28, 1920.
3 SHEETS—SHEET 1.
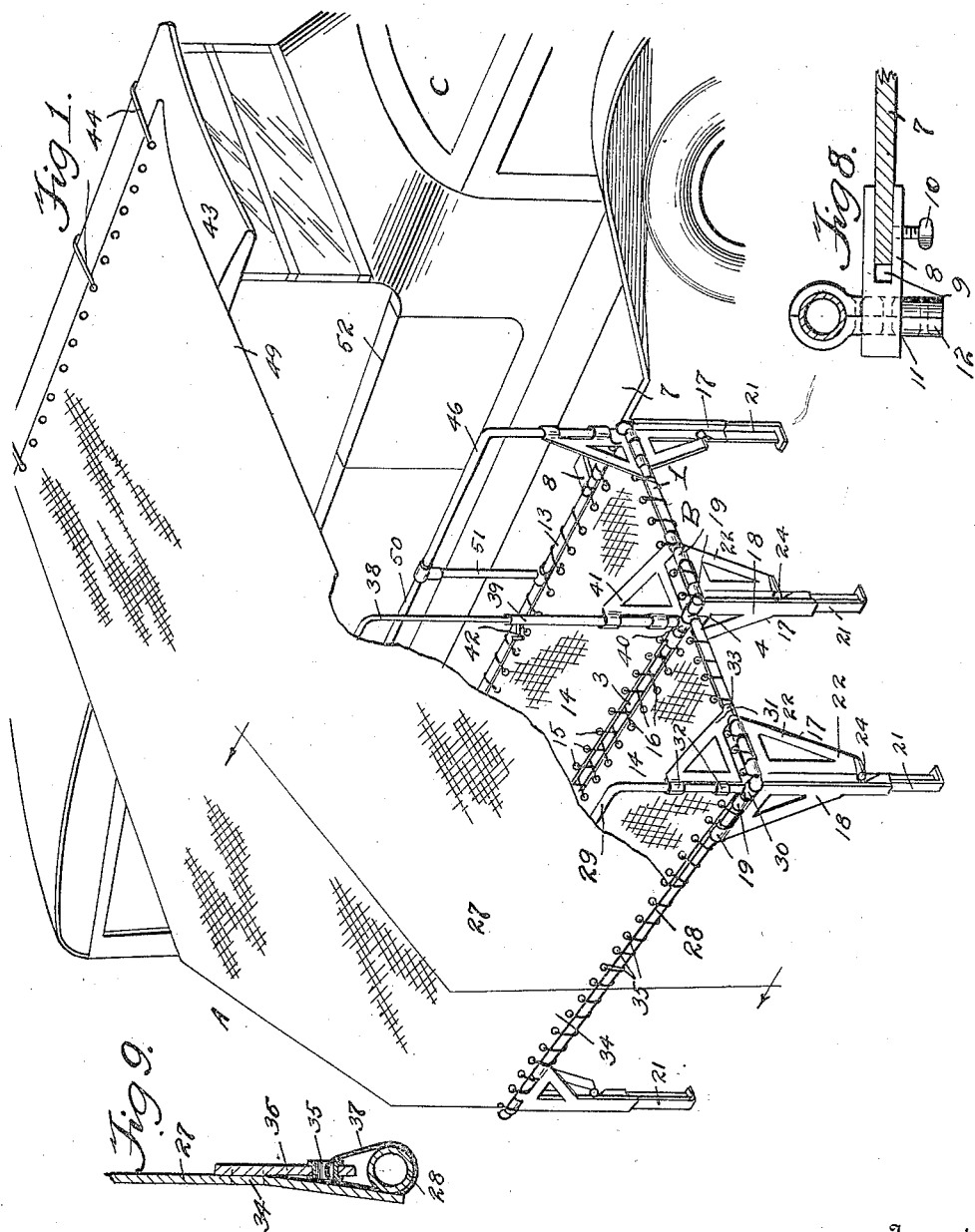
Charles B. Robertson, Inventor
Witness
A. Sundell
By
C. C. Shepherd, Attorney

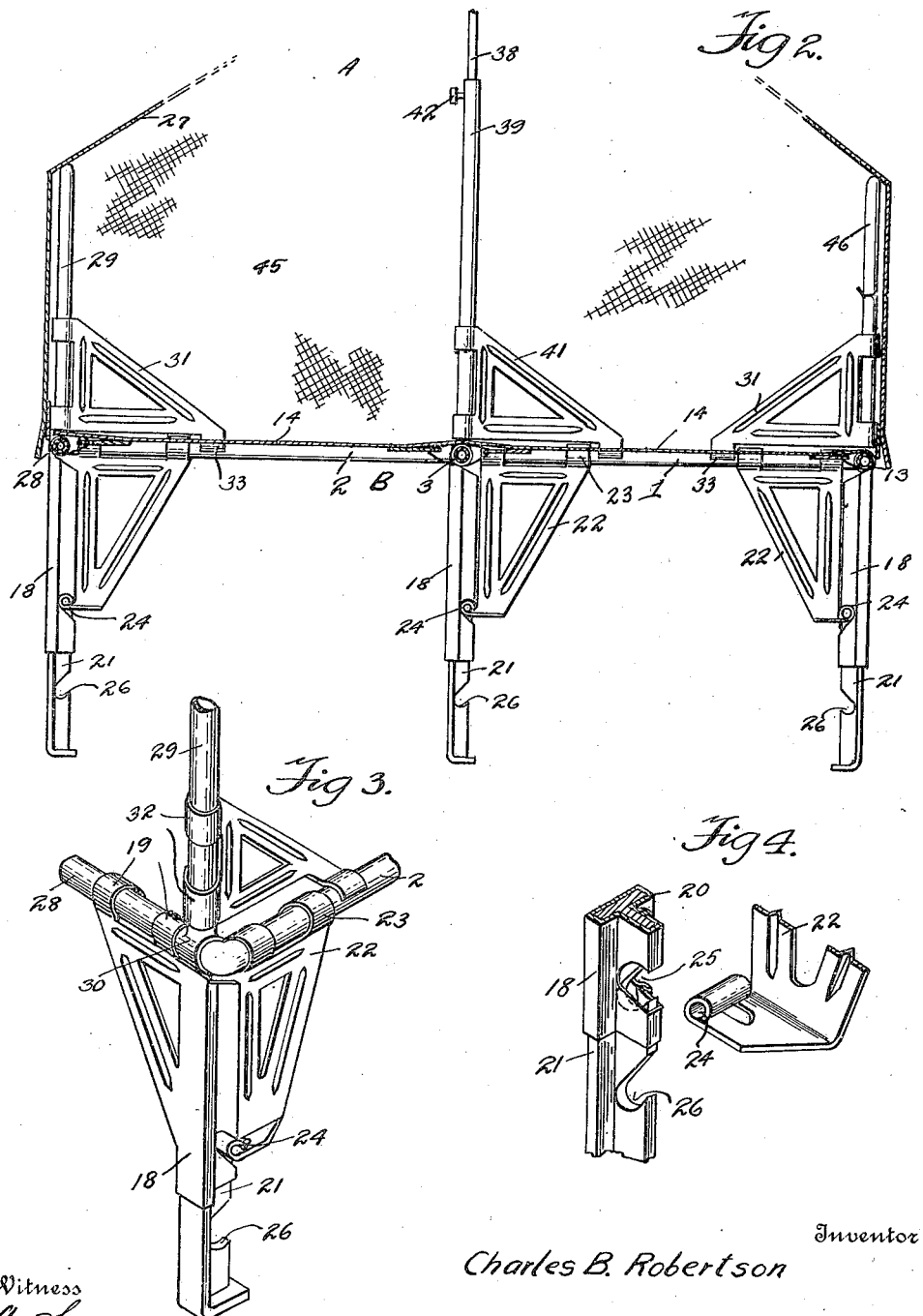

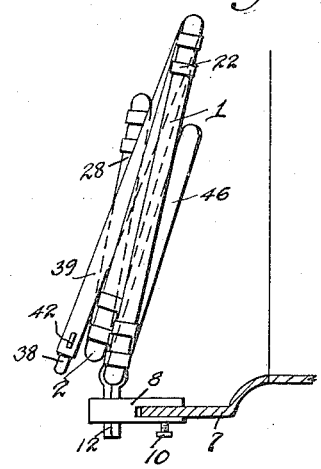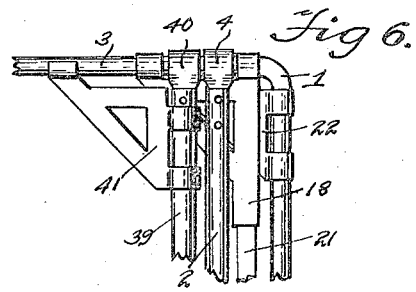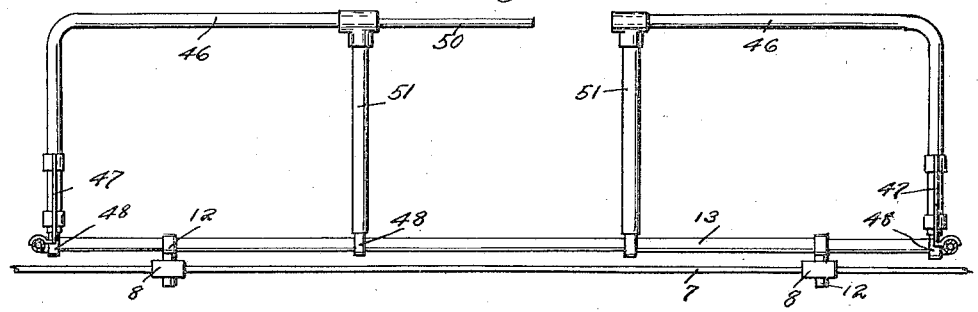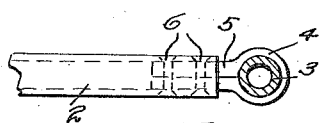

UNITED STATES PATENT OFFICE.

CHARLES B. ROBERTSON, OF COLUMBUS, OHIO.

TENT.

1,363,437.    Specification of Letters Patent.   Patented Dec. 28, 1920.

Application filed June 14, 1919. Serial No. 304,244.

*To all whom it may concern:*

Be it known that I, CHARLES B. ROBERTSON, a citizen of the United States, residing at Columbus, in the county of Franklin and State of Ohio, have invented certain new and useful Improvements in Tents, of which the following is a specification.

This invention relates broadly to tents, and has for its object to provide a tent wherein is embodied an improved collapsible frame structure, which is capable, when the tent is out of use, of being collapsed, so as to assume a very compact body in order that the same will occupy but a minimum of storage space, and yet when extended, said frame will produce a tent of considerable proportions with extreme rigidity and capable of being readily set up in a convenient and substantial manner.

Another object of the invention resides in an improved tent structure of the above character which may be readily adapted for use in connection with automobiles and embodying features of construction whereby the same may be conveniently folded in a compact manner by the automobile so as to be carried therewith, and when extended and in operative use, said tent structure will be capable of being efficiently adapted for shelter affording purposes.

The invention consists essentially in the provision of an improved frame structure, wherein is embodied a plurality of foldably connected frames, with which are associated pivotally mounted and depending leg members, which may be folded to assume positions parallel with said frames when the structure as a whole is collapsed, in order that the parts of said structure may be compactly and flatly related for space economizing reasons, and to provide said leg members with adjustable extensions in order that the frames may be maintained on a uniform plane when the tent is set up.

A further object of the invention resides in a frame structure which may be efficiently used in connection with a motor vehicle or may be employed with equal facility independently of said vehicle, in order that the range of utility of the tent may be accordingly enlarged, and to render the same thus adaptable under all manner of camping or outdoor conditions.

Other objects of the invention reside in a frame structure which is capable of being economically produced, exceptionally light in weight, convenient to erect and effectively rigid when in a set-up condition.

With these and other objects in view, as will appear as the description proceeds, the invention accordingly consists in the novel features of construction, combination of elements and arrangement of parts, hereinafter to be fully described and to have the scope thereof pointed out in the appended claims.

The accompanying drawings:

Figure 1 is a perspective view illustrating the application of the improved tent structure comprising the present invention to the motor vehicle.

Fig. 2 is a vertical transverse sectional view taken through the tent structure and illustrating the same as when employed independently of a motor vehicle.

Fig. 3 is a fragmentary perspective view of one of the leg structures employed by the frame of the tent.

Fig. 4 is a similar view setting forth the adjusting features of one of the leg members.

Fig. 5 is a view in end elevation of the frame structure and illustrating the latter in a collapsed position upon the running board of the motor vehicle.

Fig. 6 is a detailed plan view of the central meeting portion of the frame structure and illustrating the same in a collapsed position.

Fig. 7 is an elevation of the rear frame members.

Fig. 8 is a detailed view of the clamp employed for connecting the frame structure with a vehicle running board, and, Fig. 9 is a detailed view of the tent cover.

Fig. 10 is a detail sectional view showing the swivel connection between the outer and main frame members.

Similar characters of reference denote like and corresponding parts throughout the several views of the drawings.

Referring more particularly to the structural details of the invention, use is made of a tent A, which is formed to include a collapsible frame structure B. As stated above, the frame structure is of such character as to permit the same to be employed in connection with the motor vehicle C, and said structure is so formed as to permit of the use of the tent independently of the vehicle C. However, in view of the fact that the use of the tent in connection with a motor vehicle admirably sets forth its many advantages and principles of utilization, a portion of the following description will be accordingly limited to this particular use of the tent, but it will be appreciated that this use is merely ancillary to the invention as a whole, and therefore should not be taken in the limiting sense.

The frame structure B consists essentially of a pair of rectangular frames 1 and 2, which are preferably formed from a suitably sized piping, which is bent to produce the desired contours of the frames. The outer frame 2 is of substantially U shaped configuration and the ends thereof are connected with the longitudinally extending portions 3 of the frame 1 by means of split clamps 4. These clamps are formed with elongated studs 5, which project into the bores formed in the extremities of the frames 2, and are suitably secured therein. The separate halves of the clamps are united by means of bolt members 6 or their equivalents, so that the clamps may be securely connected for pivotal movement with the portions 3 of the frame 1. By virtue of this construction it will be manifest that the frames 1 and 2 are articulately connected, and are capable of extending on parallel planes, or may be folded one adjacent the other so that the two frames, when folded, will occupy substantially the space of but one of the frames. To unite the frames to the running board 7 of the vehicle C, there is provided a plurality of brackets 8, which are provided with bifurcated extremities 9, the latter being adapted to receive the outer edge portion of the running board and by means of set screws 10, said brackets may be securely retained in their mounted positions upon the running board 7 and yet may be quickly removed from the latter. The outer ends of the brackets 8 are provided with vertical openings 11, into which are inserted split fulcrum members 12, the latter being so constructed that their heads will encircle the inner edge portions 13 of the frame 1, so that the frame structure as a whole will be pivotally mounted in connection with the vehicle C.

Disposed to bridge the frames 1 and 2 are fabric bottom members 14 which are employed to provide a base for the reception of suitable bedding, as will be clearly understood. It has been found preferable to provide the marginal portions of the members 14 with suitably reinforced eyelets 15, through which are passed flexible cables 16, which serve to lash the members 14 in a secure manner to the frames and to render their construction exceptionally stanch, whereby the members will be amply capable of receiving and supporting the weight imposed thereon.

To maintain the parallelism of the frames 1 and 2 when the latter are in their extended positions and to support the same in spaced relation from the adjacent ground, use is made of a leg structure 17, which is of a readily collapsible nature, firmly braced to withstand lateral or other stresses and of an adjustable character so that the plane of the frame may be uniformly maintained irrespective of ground undulations. To this end, the leg structures 17 are disposed at the corners of the frames 1 and 2, and in view of the fact that each of the leg structures are substantially identical in formation, a description of one will suffice for all. The leg structures, therefore, essentially consist of a main leg member 18, which is preferably formed from a blank of stamped metal and bent to assume proper contours. The upper edge of the leg member is provided with curved ends 19, which surround the adjacent portions of the frames 1 and 2, so that the member 18 will depend from the particular frame with which it is connected. By thus pivotally connecting the member 18, the same may be collapsed to assume a plane substantially parallel with its associated frame. The vertically extending edge of the member 18 is provided with a T shaped groove 20 into which is slidably mounted a leg member 21, which is adapted to project below the lower end of the member 18.

In order to render the member 21 adjustable with respect to the member 18, and to provide a leg structure of well braced properties, each of said leg structures is provided with a depending brace element 22, which is also formed from stamped material, and is provided at its upper edge with curved looped portions 23, designed to encircle the adjacent portions of a frame with which it is attached, and said brace element is designed to lie substantially at right angles to the member 18. The lower end of the element 22 is formed with an offset curved projection 24, which is capable of being inserted into the recesses 25 formed in the lower end of the member 18. The leg member 21 is, in turn, provided with a vertically arranged series of cut-out portions 26, which are designed to register with the recess 25, and it will be manifest that by inserting the projection 24 into engagement with the walls of the recess 25 and a registering cut-out portion 26 that the leg member will be maintained immovable with respect to the member 18, so that the leg structure as a whole will be capable of supporting the frames. By changing the portion 26 which engages with the projection 24, suitable variations may be made in the height of the leg structure. It will thus be manifest that the level of the frames 1 and 2 may be maintained without paying particular regard to the curvature of the ground upon which the tent is erected. The construction of the leg structure described has been found to be economical to manufacture and of marked strength when the parts are assembled. It will be noted that the member 18 and the brace element 22 are situated at right angles with respect to each other, and therefore the leg structure is fully capable of withstanding the many complex stresses which are placed thereon. When the structure B as a whole is collapsed, it will be observed that the parts forming the leg structures may be disconnected so that the same may be swung to assume positions parallel with the frames 1 and 2 and in this manner economy in storage space is provided by the flatly related portions 18 and 22. This arrangement of the collapsed members is particularly shown in Fig. 6.

In order to connect the fabric covering 27 with the structure B, the outer longitudinally extending portion 28 of the frame 2 is equipped with a substantially U shaped frame element 29, which has its ends pivotally united as at 30 with the portion 28. The element 29 is capable of assuming a rigid vertical position by means of pivoted brace brackets 31, the latter being provided with looped portions 32, which encircle the vertically disposed portions of the element 29, and said brackets are adapted to extend at right angles to the element 29 and are provided with bearing portions 33, which engage with adjacent portions of the outer frame 2. It will thus be manifest that the brackets 31 serve to brace the element 29 against inward collapsing movement when said elements are in a vertical position, but by disengaging said bracket devices from contact with the frame 2, the element 29 may be readily swung so as to lie in the same general plane as is occupied by the frame 2. The covering 27 has its lower edge 34 provided with eyelets 35, which latter may be connected with a flap 36, as shown in Fig. 9, on the inside of said covering, so that the cable 37 binding the edge 34 to the frame 2 may be invisible from an exterior view point and also to generally brace or reinforce said lower edge of the cover. The latter extends upwardly and is passed over the top of the frame element 29, and is then directed obliquely upward into engagement with the upper portion 38 of an intermediate frame 39. The lower portions 40 of said frame 39 are pivotally connected with the longitudinally extending portion of the inner frame 1, and are capable of being braced when in a vertical position by means of brace brackets 41, which correspond in construction and utility to the brackets 31. And the height of the intermediate frame may be regulated by adjusting the upper portion 38 within the lower portion 40, this adjustment being effected by telescoping said upper and lower portions of the frame 39 one within the other, and said parts may be maintained in their adjusted positions through the provision of set screws 42. After passing over the intermediate frame, said covering is passed over the top 43 of the vehicle C, and may be lashed to the latter by means of suitable cables 44. End walls 45 are formed with the covering 27 so that the ends of the tent may be closed if desired.

To permit the tent A to be employed without involving the use of the vehicle C, the inner edges of the frame 1 are provided with a pivoted frame element 46, which corresponds generally to the element 29, and is supported in an upright position by means of brace brackets 47, the lower edges of the element 46 being pivotally connected as at 48 with the inner edges of the frame 1. Obviously, by disconnecting the brackets 47 from engagement with the end portions of the frame 1, said elements 46 may be collapsed upon the frame 1. As shown in Fig. 2, when the tent is used separately from the vehicle C, the edge 49 of the covering may be suitably connected with said element 46, so that a rigid tent structure will be provided. In order to prevent the element 46 from interfering with the ingress of occupants when the tent is used in connection with the vehicle C, the central portion 50 of said element 46 is telescopically formed and is provided with upright struts 51, which are so located as to be positioned in alinement with the door 52 of the vehicle C. By telescoping the portion 50 within the remainder of the frame element 46, an aisleway will be provided between the struts 51, so that the tent may be readily entered by simply stepping out of the vehicle C.

From the foregoing description taken in connection with the accompanying sheets of drawing, it will be apparent that there is provided a tent of considerable utility in its particular field. The parts of the frame structure B are so arranged as to be capable of being conveniently folded one upon the other so that the tent will occupy but a very small amount of space when in a collapsed position. This enables the same to be readily carried upon the running board of a vehicle, as is shown in Fig. 5. However, when in an extended or set-up position, the frame structure B is so formed as to be braced against all manner of stresses so that its undue or accidental collapse will be effectively avoided. Another advantage of the invention from a commercial standpoint resides in forming the leg structures substantially of stamped metal, whereby lightness in weight is secured combined with exceptional strength. The tent structure may be set up or collapsed in but a minimum of time and may be efficiently used either in connection with a motor vehicle or by itself. To disconnect the frame structure from an automobile, it is simply necessary to lift the same out of engagement with the brackets 8, this feature being accomplished by the structural formation of the studs fitting into the openings 11 in the brackets 8. It will thus be apparent that the tent structure is particularly adapted as a temporary shelter for motorists or for others engaged in outdoor pursuits.

I claim:

1. A tent structure comprising a main substantially rectangular frame, an outer frame pivotally connected with said main frame and capable of assuming extended or collapsed positions relative thereto, means for supporting said frames in their relatively extended positions, comprising a plurality of depending leg members pivotally carried by said frames and arranged to assume extended or collapsed positions, brace elements pivotally carried by said frames and arranged at right angles with respect to said leg members when the latter are in their extended positions, and adjustable leg pieces carried by said members and capable of being retained in their adjusted positions by the coöperation of said brace elements.

2. A tent structure comprising a plurality of similarly shaped pivotally connected frames capable of assuming relatively collapsed or extended positions, means for maintaining said frames in their extended positions, comprising a plurality of pivotally mounted leg members depending when in extended positions from said frames, brace elements pivotally carried by said frames and arranged substantially at right angles with respect to said leg members and adapted when folded to lie flatly with respect to said leg members and said frames, offset projections formed upon the lower ends of said brace elements and arranged to be received within notches formed in said leg members, and a plurality of adjustable leg pieces telescopically mounted within said leg members and having a plurality of teeth formed therein, and said teeth being arranged to engage with said projections and to retain the leg pieces in adjusted positions with respect to said leg members.

3. A tent structure comprising a frame, a bed structure arranged to be stretched across said frame, a plurality of depending leg members pivotally carried by said frame adjacent to the corners thereof, said leg members being capable of being folded upon said frame when the tent structure is collapsed, telescopically mounted leg pieces carried by said leg members, brace elements pivotally carried by said frame at right angles to said leg members, projections formed upon said brace elements and arranged to seat within alining recesses formed in said leg members and said leg pieces in order to retain the latter in their severally adjusted positions, and means for connecting a covering with said frame.

In testimony whereof I affix my signature.

CHARLES B. ROBERTSON.